United States Patent [19]

Halpern

[11] Patent Number: 4,859,837

[45] Date of Patent: Aug. 22, 1989

[54] PORTABLE DATA CARRIER INCORPORATING MANUALLY PRESETTABLE PROCESSING MODES

[76] Inventor: John W. Halpern, 14 Belsize Park Gdns., London, N W 3, England

[21] Appl. No.: 246,035

[22] Filed: Sep. 15, 1988

Related U.S. Application Data

[63] Continuation of Ser. No. 30,274, Mar. 23, 1987, abandoned, which is a continuation of Ser. No. 343,829, Jul. 6, 1982, abandoned.

[51] Int. Cl.$^4$ .............................................. G06K 5/00
[52] U.S. Cl. .................................. 235/380; 235/492; 235/379; 362/708; 902/26
[58] Field of Search ................ 235/486, 492, 379, 380; 364/406, 408, 708; 902/26

[56] References Cited

U.S. PATENT DOCUMENTS

| | | | |
|---|---|---|---|
| 3,453,598 | 7/1969 | Schweizer | 235/449 |
| 3,651,512 | 3/1972 | Summers | 340/365 R |
| 3,971,916 | 7/1976 | Moreno | 902/26 X |
| 4,001,550 | 1/1977 | Schatz | 902/26 X |
| 4,005,388 | 1/1977 | Morley et al. | 340/365 R |
| 4,105,156 | 8/1978 | Dethloff | 902/26 X |
| 4,291,222 | 9/1981 | Grottrup | 235/386 X |
| 4,341,951 | 7/1982 | Renton | 364/406 X |
| 4,453,074 | 6/1984 | Weinstein | 902/26 X |
| 4,454,414 | 6/1984 | Benton | 364/406 X |
| 4,460,965 | 7/1984 | Trehn et al. | 902/26 X |

Primary Examiner—David L. Trafton
Attorney, Agent, or Firm—Shlesinger & Myers

[57] ABSTRACT

A portable pocketsize data carrier, also referred to as pay token, stores more than one bank and/or credit account number in selectably accessable registers. The pay token is equipped with four or five selector buttons for carrying out a large variety of performance modifications. Aided by visual feedback through an integrated display window, the user may using a single button (a) insert a confidential number into the pay token for internal comparison with a factory-made number which cannot be read out (b) Select and activate one of 9 account or similar registers (c) Define a small cash amount in single figures currency units or a multiple thereof which the user desires to transfer from a selected token account to an uncommitted register, the rapid payment register or money register. The latter is electronically so connected that entry of the personal identifying number is not required prior to payment from that register—as is required when payment is made from any of the account registers directly.

The purpose of producing a long-life multiple account pay token is gradually to reduce the demand of coins and bank notes thereby lowering the high cost of minting and printing them; in parallel thereto the relatively high cost of operating cheque accounts by banks shall be reduced.

19 Claims, 4 Drawing Sheets

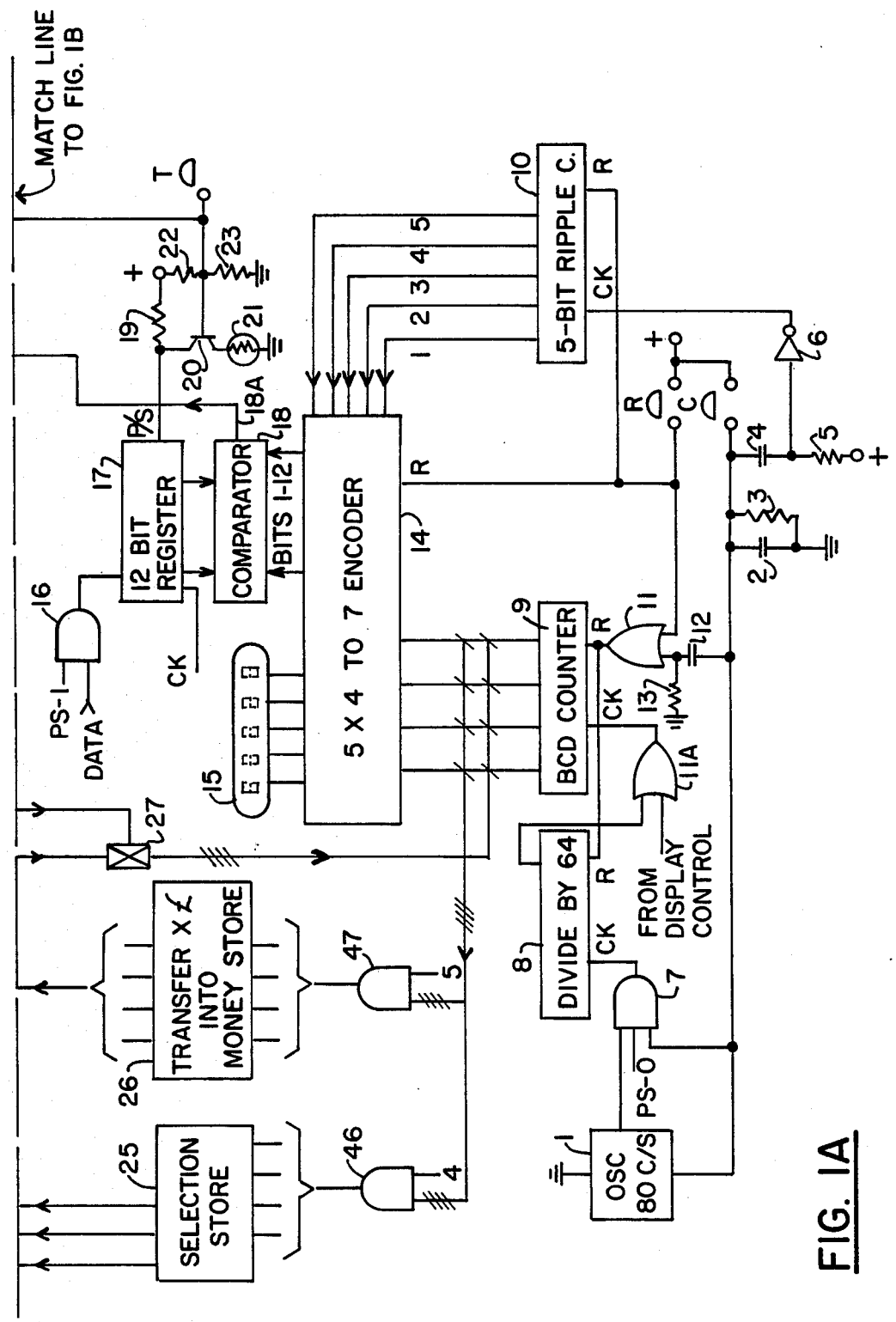
FIG. IA

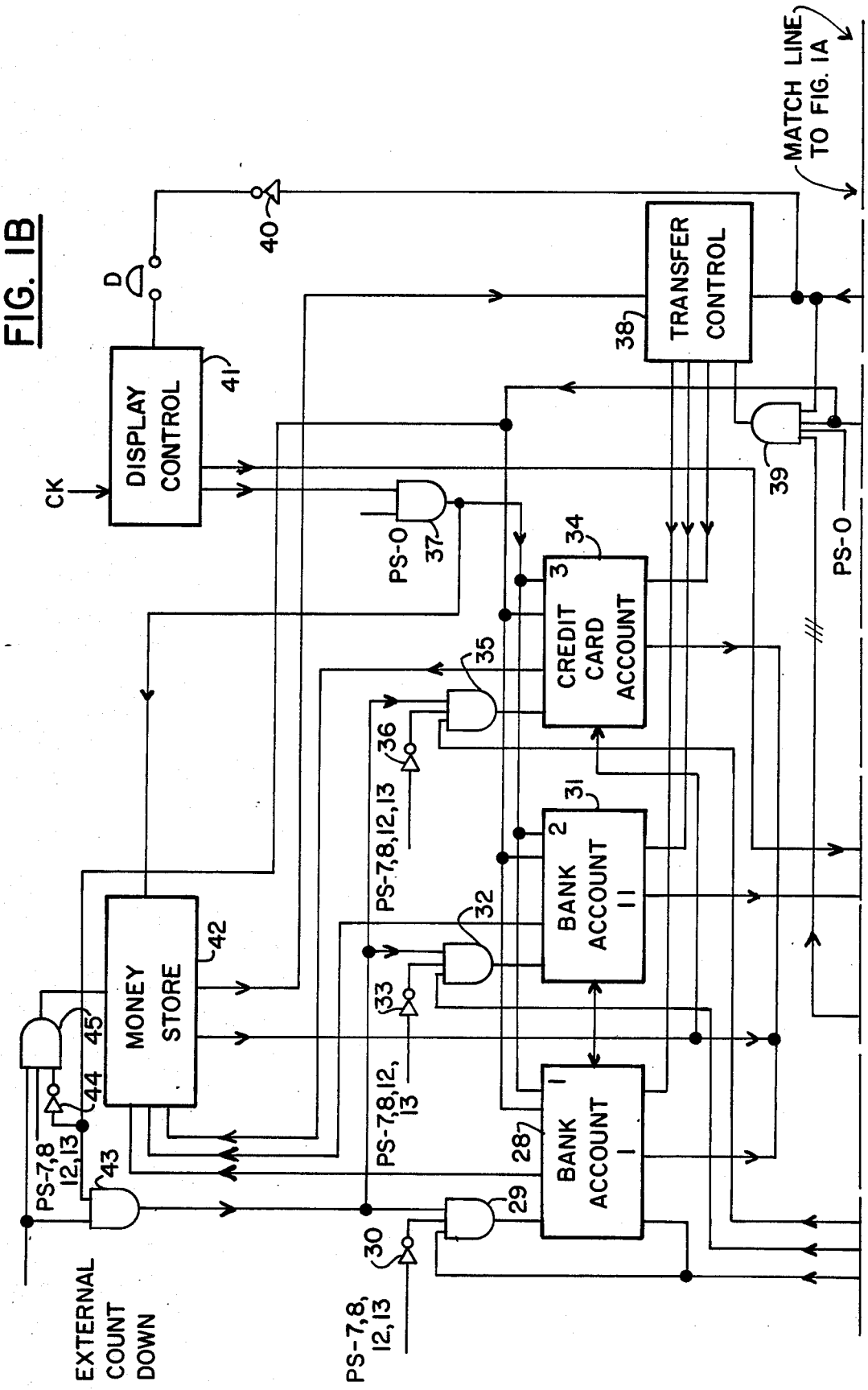

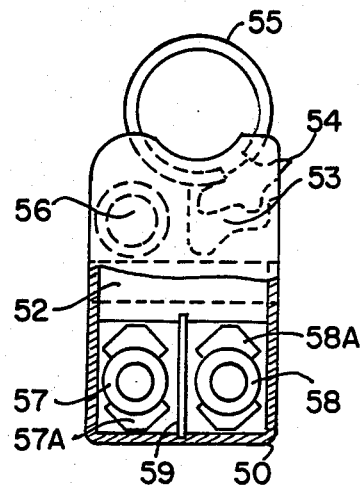
FIG. 2
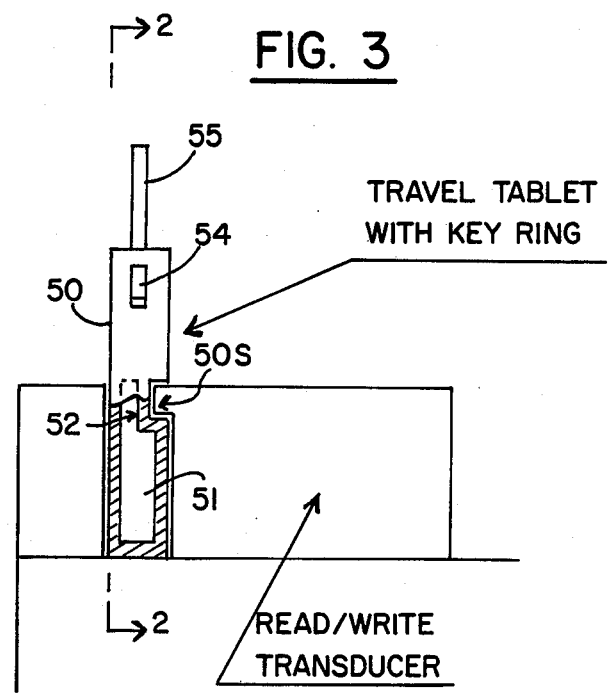
FIG. 3
TRAVEL TABLET WITH KEY RING
READ/WRITE TRANSDUCER
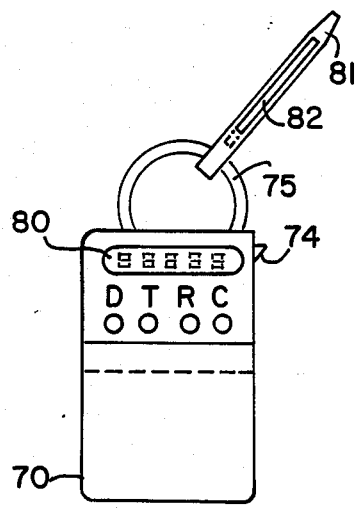
FIG. 4
FIG. 4A
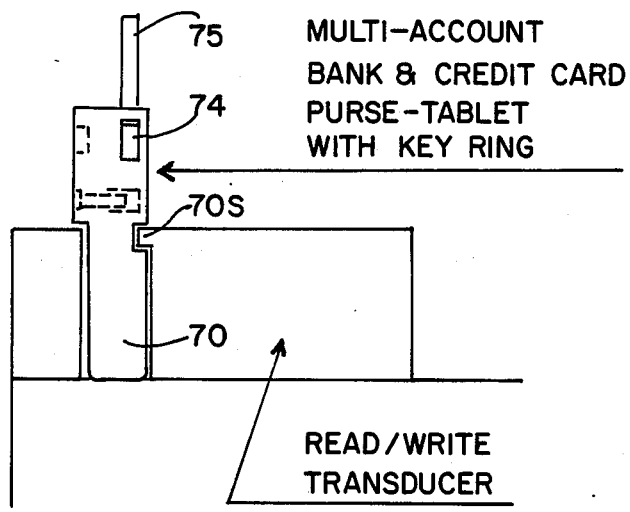
FIG. 5
MULTI-ACCOUNT BANK & CREDIT CARD PURSE-TABLET WITH KEY RING
READ/WRITE TRANSDUCER

PORTABLE DATA CARRIER INCORPORATING MANUALLY PRESETTABLE PROCESSING MODES

This is a continuation of application Ser. No. 030,274, filed Mar. 23, 1987, now abandoned, which is a continuation of application Ser. No. 343,829, filed July 6, 1982, now abandoned.

This invention relates to improvements in portable self-contained data carrying components which can be used for bi-directional communication via an associated data terminal with a calculator or location encoder terminal, and which data carrier is capable of performing at least a portion of the required data processing function within its own miniaturized circuitry.

The present paper is a continuation of the authors' earlier work as manifested in British Patent No. 1,314021, B.P Applications No. 7931208 7911393, 8010709, U.S. Pat. Nos. 3,870,866 and 3,906,460 to some of which reference will have to be made in the course of the detail description. Also other attempts have become known to create personal information bearer; it is noteworthy that the general trend is restricted to the aim of making already existing bank cards more secure and of obliging the general public to observe the constraints placed upon their proper use. To this comes the additional aim of avoiding on-line contact from the bank-or point of sale terminal with a central computer installation because of the considerable cost of dedicated data lines.

The object of this invention includes but is not limited to the named improvements; not the replacement of one bank card by another is the main objective but the replacement of money in a large number of situations where this implies inconvenience as well as administrative inefficiency, often rightout harmful or costly bottlenecks in the delivery of services and facilities. The purpose of this invention is therefore the creation of devices which, on the one hand, can be handled as conveniently and rapidly as a coin in the pocket, on the other hand become a link at the disposal of the individual in a network of electronic fund transfer communication lines.

While thus the field of 'small cash transaction' is in the foreground, the technique to be developed must also fully meet the requirements of a bank card for medium and even large purchases. The comprehensiveness of these objectives brings problems since it is wellknown in the art that a valuable card can be protected from misuse by finders in the event of loss only by certain preparatory action required to be performed by the card user before the card functions. This is the keying in of a secret personal number which is checked against the true record of that number in the card itself.

Such a process takes time, there may be more people in a queue using the same terminal. Someone wishing to pay, say, 47 p in coins would resent having to spend any time whatever on dialling a personal number. Speed and Security appear thus as contradicting requirements. One of the purposes of this invention is to overcome this matter. Another problem is that many people have several accounts which they use dependent on circumstances. In some cases Giro is best, in others one of the large Clearing Banks, in still others a local Bank, and, where cash flow suggests a credit card account is often used. All these accounts should benefit from electronic fund transfer technology but it would be too expensive to produce a separate 'electronic coin' for each of them. This leads to the concept of a "multi-mode electronic fund transfer purse". Just as a purse has several compartments meant for coinage, bank notes, credit cards and cheques, so the proposed on-person pay device would be adaptable to give out or receive value data at one time from/into a selected bank account, at another time from/into a credit account, and for all rapid small cash transactions from a money store. In addition, the device should perform checking and calculating duties in situations where small cash payments are frequent such as in supermarkets, in the use of taxis and public transport, and in many access control requirements where payment for access, or the time lapse of the period within the paid area, also occurs (See for example Br. P. No. 857,658 or U.S. Pat. No. 3,609,300 and U.S. Pat. No. 3,870,866). Parallel with the described requirements goes the need to be able to call forth on a display window, preferably away from any terminal, the status in any of the memory sections. In its general form, new solutions are offered and described in the copending British patent application Ser. No. 8028824. The techniques hereunder described constitute special embodiments which, among others, illustrate the possibility of producing a very compact personal data carrier such as could be carried about on a key ring together with standard Yale or similar keys.

The explanation of the invention principles is aided by examples which are illustrated in drawings 1–9 wherein FIGS. 1A and 1B combined represent a diagram of a portion of the integrated circuitry in the data carrying component FIGS. 2 and 3 are views of a particular realisation of the data carrying component FIGS. 4 and 5 are views of a very similar data carrying component after incorporation of a display window and manual controls FIG. 4a shows a holding pin, FIG. 6 shows the electrical structure of the integrated circuitry capable of not merely fulfilling the functions associated with the manual selection buttons on the device but, all the functions of the component including for example those described in detail in our Patent Application Nos. 8004546 or 8028824.

Figure 6:
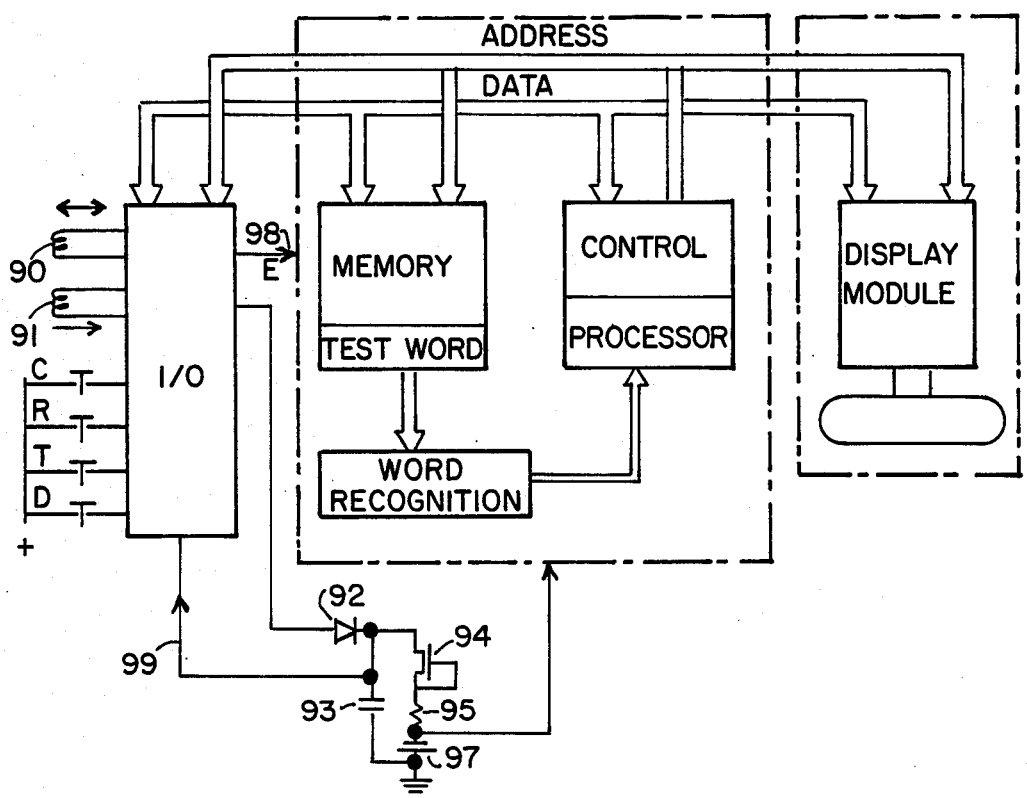

The display window shown in FIG. 4, item 80, can also be seen in the diagram FIG. 1A, item 15; equally, the push buttons C, R, T and D can be seen in the said diagram, FIGS. 1A, 1B.

The function of the control button R is to reset all temporary stores. By depressing button C the Oscillator 1 receives operating voltage from the battery which is encapsulated in the component (FIGS. 2 or 4).

In consequence 80 c/s pulses pass through gate 7 which can only work when the device is in its PS-O condition (program step O, see patent appl. No. 8028824). Applied to a divide by 64 counter the output provides for one clock pulse every $\frac{3}{4}$ seconds which passes through OR gate 11a to a BCD counter 9 which applies the 4-line output to an 4–7 encoder 14. The ripple counter 10 has five output lines which act as enable inputs to the 5 latchable 4 to 7 encoder circuits within block 14. These in turn drive five display digits in unit 15. Initially, only the first digit on the left is enabled through ripple counter output '1'. As button 'C' is depressed the first digit on the left counts successively from 1 to 9 at ¾ seconds interval and goes on counting that way as long as button C remains depressed. The user has the task to insert into the first three left-hand figures a 3-digit number known only to him. This number is then to be compared in a comparator 18 with a number permanently recorded in a 12 bit shift register 17. Dependent on whether the comparator output 18a is forthcoming or not, any subsequent operation is either permitted or not. The personal data are inserted into the shift register 17 by the issuing office when the data token is first acquired. In that initial condition the register is in its serial mode due to the fact that the fuse-resistor 21 is still conductive. After the insertion of the number duing program step PS-1 (reference BPA No. 8028824), the register is still in the serial mode and to put it once for all into the paralell data input mode the pushbutton T must be pressed. This renders the transistor 20 highly conductive so that the relatively high current burns out the resistor element 21.

The method of producing three personal number digits is to release button C as soon as the desired first digit appears. This causes oscillator 1 to stop, at the same time the ripple counter 10 receives a single clock pulse generated in the resistor-capacitor combination 4,5. Accordingly, the next digit is enabled and when button C is depressed again the count begins there while the first digit remains latched. And so on until all the three personal numbers are in place. This insertion of the secret personal 'Enable' number can be carried out in complete privacy, and therefore constitutes an improvement on the present practice of having to use a public terminal. In this system the private identification number is actually compared with the number in register 17 only after the data token is used for any functional purpose. Prior to that, any error can be corrected by cancelling the display by means of reset button R and repeating the process. Once the token proceeds to a functional stage the error cannot be undone; only a limited number of such errors are permitted before the data token is irreversibly disabled (see U.S. Pat. No. 3,906 460). This is achieved by providing in the circuitry (here not shown) a so-called fraud counter. The same is advanced every time a faulty comparison occurs and, at a given or preset point, the register causes the named irreversible action.

Once the PIN number is inserted, the user may carry it about (the display would be cut out by an internal time switch after about 6 seconds) until the occasion for use arises. In that case, any payment would be made from a previously set account store. However, if payment should be made from another account store, this must be preset as well, and that is done in the following manner:

Having inserted the PIN number the user proceeds by inserting a figure into the fourth digit in the same way as already discribed. The fourth digit is a reference number referring to one of several account stores present in the data token circuitry. Each of these account stores corresponds to a value register as described in patent appl. No. 8028824, item C3 in FIG. 1B. In the pay contaxt these stores hold amounts of money and each store may be associated with a particular bank account of the owner. However, some stores may be used for memory aids as desired by the user, or they may include cumulative items of interest to the user (sum of all expenditures, etc). Each of these memory items can be recalled selectively by mean of button C alone and caused to be displayed by pressing button D.

In FIG. 1B only four stores are shown namely store "1" containing a bank account (as loaded by that bank), store "2", another bank account (as loaded by another bank), store "3", a credit card account containing a credit maximum minus all usage of that credit, and store "4" called a 'money store'. The latter is an uncommitted store that is to say the same may accept small money values from any of the account stores in use.

The circuitry makes it possible to transfer a selected money value in round together with the appropriate account number, issuing branch and issuing date from any particular account store 28 or 31 or 34 into the memory of circuit 42. The user when wishing to pay for a certain item has the choice to make payment from any of the named value stores. The difference between the money store and the account stores in this respect is only that the money store is instantly usable; the account stores as explained, to be enabled require the P.I number to be inserted first prior to each transaction. This ensures of course that major amounts cannot be transferred from a stolen data token. This condition is not attached to the money store because therein only a cash allowance sufficient for the day's small cash transactions can be stored, and in the event of loss of the device the damage would be minor. It should be noted, however, that also in the case of 'money' or small cash payments made from the money store, the full details of the source (bank account, bank branch, bank number etc.) would be transferred to the point of sale terminal together with the actual amount paid. These data would then be put into the data stream in nightly transmissions to the various originating bank branches and no distinction is made between large or small amounts. It is thus clear that a person may readily ride a bus by using his or her token credit account. This possibility will enhance the very popular use of 'credit cards' for travel purposes. After the selection of the account by means of button C, the purpose of the fifth digit is to selected the £ value to be transferred to the socalled 'money store'. After all the five digits are set, the user pushes the T button which actuates the transfer control module 38 (FIG. 1B) which controls all the internal transfer functions. These also imply that any remnant value in the money store together with the requisite bank account data are emptied thereform and returned to the appropriate account store while new data are being inserted.

The count-down debiting pulses are applied to any of the selected stores in program step 8 (see pat. specification BP No. 8028824). External readout occurs in PS-7 whereas in PS-12 value data are added to the status of a selected account and in PS-12 the result is externally read out (see the named British application). 'Count down' is identical with reducing the value data level by the amount preset by the external point of sale terminal. Overstepping the allowed credit is not possible since the readout in PS-7 establishes at once whether there is enough value in the account concerned.

Next the simple data carrying component capable of holding only one account memory will be explained by means of FIGS. 2 and 3. A plastic container 50 comprises a hollow space 51 for placing therein ferric yokes and cores 57a and 58a with their coils 57 and 58 respectively. One of these serves the injection of clock pulses and energy, the other sends and receives the bidirectional data stream. Another internal space is 53 wherein a trigger level 54 is hinged and spring-loaded against an opening in key ring 53. By pressing lever 54 downwards the ring is unlatched and can now turn in either direction, permitting keys to be changed. Finally, there is a spare-out space for a long-life rechargable battery 56 which is used for maintaining memory states in the encapsulated circuitry. The read/write unit with which this data carrier cooperates will be described by means of FIGS. 8 and 9 further below. In the area 52, FIG. 2, space exists for the I C chips and subsidery items. FIGS. 4 and 5 show essentially the same unit equipped with a display 80 and the already discussed buttons C R T D. Both the afore-described simple and the multi-mode pay tablet may be used in the same data transfer terminal of FIG. 8. As can be seen in FIG. 5, the pushbuttons are recessed but can be actuated by means of a pencil or the like. To assure readiness at all times to operate the buttons, the key ring 75 may hold a pin 81 having a displaceable spring 82. The pin can be taken off easily for the intended use and be just as easily put back on the key ring. (FIG. 4a).

While the circuit of FIGS. 1A and 1B could be added to the circuitry for example as envisaged in patent application Nos. 7931208 or 8004546 or 8028824 which are devoted to the data processing of the data tablet at a point of sale terminal, it is probably more economic to design a single dedicated data processing chip capable of performing all the functions. The principle of this concept is represented in the functional diagram FIG. 6 which is largely self-explanatory. According to the security principles explained in the cited patent application at least two number comparisons are performed for each point of sale transaction, and at least four such comparisons when the data tablet is updated with added value. A similar comparison is required for verification of the personal identity number. It is therefore possible to unify all 'word recognition' operations. More such comparisons occur when remnant money value is to be returned to the originating account within the data tablet. It is therefore desirable to unite all word recognition operations. Similar contractions might be made with resspect to the basic processor program as also the internal data transfer and display functions. Current batteries can stand only a definite maximum charging current. To ensure that this current is not exceeded when energy is transferred from a terminal, the capacitor 93 is provided which rapidly accepts a charge at a higher voltage. The discharge of the capacitor then occurs via field effect transistor 94 into battry 97.(@)
(@) The feedback line is important in the context since it senses the voltage level of the capacitor 93 and causes all clock data to be disabled until line 98 at input e goes high. This ensures that the starting voltage level is sufficient.

Figure 7:
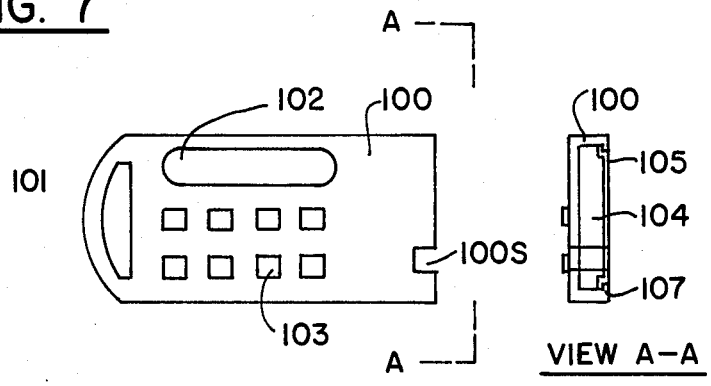
FIG. 7 shows an alternative layout of a mode-controllable data token

FIG. 7 represents an alternative configuration of a data carrier. It consists of a steel frame 100. On its upper face are inserted the push buttons 103 and the display window 102. A handle 101 allows insertion of a standard key ring. On the rearside the flanges show lips 107. The interior containes potted circuitry and, to the right of the buttons, equally potted are data and energy transfer coils. The interior plastic part is item 104. A paper card containing information useful when the item is lost, may be placed between lips 107. This item is marked 105.

Figure 8:
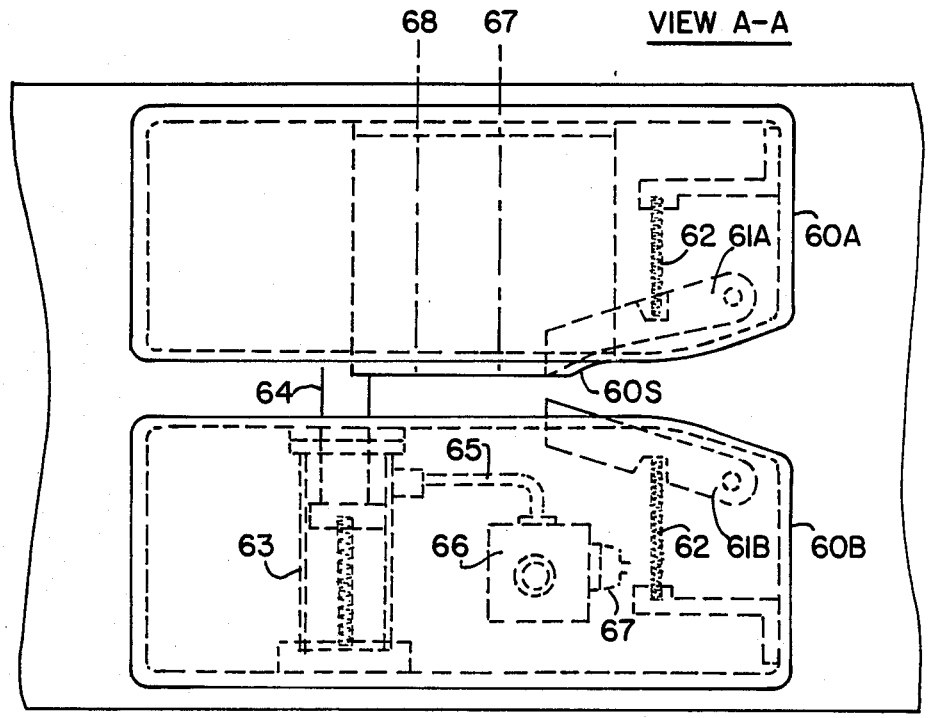
FIGS. 8 and 9 show an example of a Read/Write data transfer terminal intended for rapid presentation, especially in access and revenue control situations and at turnstile controlled passage points.
Figure 9:
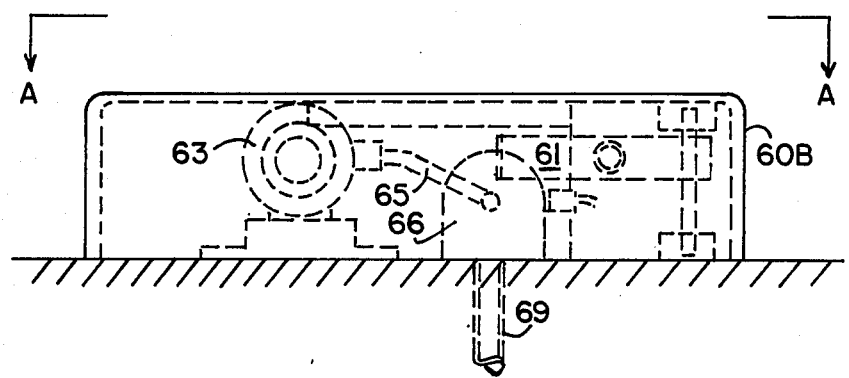

Finally, an example for checking the data tablet rapidly is shown in FIGS. 8 and 9. The tablet is introduced by sliding it upright along the smooth table surface 68 between sections 60A and 60B from right to left. When reaching key section 60s, the same will dovetail with the corresponding recess portions 50s (FIG. 2) or 70s (FIG. 4) respectively. Just before the moved data tablet is stopped by stopping rod 64, the spring loaded latch levers 61A and 61B snap inwards and so confine the data tablet to the precise area where it should be as long as the data transfer lasts. This period lasts a fraction of a second whereafter the stopping rod 64 is withdrawn rapidly allowing the tablet to be moved out in a forward direction.

This piston 64 is in this example part of a pneumatic actuator 63 with the pneumatic supply tube 65 and the electro-pneumatic valve 66 which receives its supply through pipe 69.

The electrical information transfer occurs inductively by means of sensor coils (not shown) whose axis are indicated by center lines 67 and 68 which, in the read/write position, are congruent with the center lines of the coils 57 and 58 of FIG. 2.

What is claimed is:

1. A portable data carrying and transfer device capable of communicating with an external data transfer device, comprising:
    display means;
    memory means for storing data having a plurality of memory stores;
    processing means for processing data in said memory means and for shifting data from a first one of said memory stores to a second one of said memory stores;
    transfer means for enabling bi-directional data exchange between said memory means memory stores and an external data transfer device;
    manually actuatable memory accessing means for (a) selectively displaying on said display means the data in any one of said memory stores, for (b) enabling and defining data to be transferred by said transfer means, for (c) enabling receipt of account data from an external data transfer device via said transfer means, and for (d) enabling and defining data to be transferred by said processing means; and
    a pocket-sized housing including said display means and providing support for said memory means, said processing means, said transfer means, and said manually actuatable accessing means.

2. A portable data carrying and transfer device as in claim 1, wherein:
    one of said memory means stores contains a predetermined identification number and said other stores are secured, such that said number must first be manually entered by said memory accessing means and compared by said processing means in order to access any of said secured memory means stores.

3. A portable data carrying and transfer device as in claim 2, wherein:
    at least one of said other memory means stores is unsecured, such that it may be accessed for display or data transfer first entering a predetermined identification number.

4. A portable data carrying and transfer device as in claim 3, wherein:
    data may be shifted from one of said secured memory means stores to one of said unsecured memory means stores, by said memory accessing means and said processing means.

5. A portable data carrying and transfer device as in claim 4, wherein:

prior to shifting data from one of said secured memory means stores to one of said unsecured memory means stores, any remaining data in said unsecured memory means store is automatically returned to the memory means store it originated from.

6. A portable data carrying and transfer device as in claim 2, wherein:
upon a preselected number of entries of incorrect identification numbers by said memory accessing means said processing means disables said device.

7. A portable data carrying and transfer device as in claim 3, wherein:
upon a preselected number of entries of incorrect identification numbers by said memory accessing means said processing means disables said device.

8. A portable data carrying and transfer device as in claim 2, wherein:
upon entering said predetermined identification number correctly said display means displays said number only for a preselected interval of time.

9. A portable data carrying and transfer device as in claim 1, wherein:
said memory means, said processing means and said transfer means are combined in a single integrated circuit.

10. A portable data carrying and transfer device as in claim 1, further comprising:
an operating voltage sensor circuit that allows said device to be operated only when a minimum voltage level is present
and disables said device if a maximum voltage level is exceeded during operation.

11. A portable data carrying and transfer device as in claim 1, wherein:
said housing contains a transverse groove to serve as a retaining element when placed in said external data transfer device.

12. A method of utilizing a pocket-sized electronic data carrying, processing and transfer device in conjunction with an external data transfer device, said pocket-sized data carrier including memory means for storing data having a plurality of memory stores, a manually actuatable memory accessing means and transfer means for enabling bidirectional transfer of data between said data carrier and said external data transfer device, the method comprising the steps of:
entering a predetermined password into said carrier using said accessing means to enable the device;
defining data to be transferred from a single memory means store to said external data transfer device, using said accessing means; and
operatively engaging said pocket-sized device with said external data transfer device.

13. A pocket-size portable data storage and processing device, comprising;
first memory means for storing data representative of a first quantity,
second memory means for storing data,
processing means actuatable for exchanging a portion of said first quantity from said first memory means to said second memory means representative of a second quantity,
transfer means for outputting a portion of said second quantity and maintaining a remainder of said second quantity in said second memory, wherein:
said processing means is actuatable to exchange said remainder from said second memory to said first memory means.

14. The device of claim 13, further comprising:

a third memory means for storing data representative of a third quantity, wherein:
said processing means is further actuatable to exchange a portion of said third quantity from said third memory means to said second memory means, and an origin indication is exchanged with said quantity from said first or third memory means into said second memory means.

15. A portable data carrying and transfer device, as in claim 1, wherein:
said manually actuatable memory accessing means further comprises a plurality of pressable buttons where, upon pressing one of said buttons, one of said functions of said accessing means is carried out.

16. A method of accomplishing electronic financial transactions, comprising the steps of:
providing a portable electronic data device having memory means representative of a plurality of accounts,
storing a monetary value in at least a first one of said accounts,
subtracting a portion of said monetary value,
shifting said portion of said monetary value to a second one of said accounts, combined with a first account identifier,
transferring a portion of the value of said second account, equal to a sales value, and said identifier to an external sales transaction device,
subtracting said sales value from said data device having memory means representative of a second account value, to establish a remainder, and
shifting said remainder to said first account, adding said remainder to said account value to establish a residual first account monetary value.

17. A portable data carrying and transfer device capable of communicating with an external data transfer device, as in claim 1, wherein:
at least one of said memory stores represents an account.

18. A portable data carrying and transfer device capable of communicating with an external data transfer device, as in claim 1, wherein:
all of said memory stores represent accounts.

19. A method of utilizing a pocket-sized electronic data carrying, processing and transfer device in conjunction with an external data transfer apparatus, memory means for storing data in a plurality of separately addressable memory stores, wherein at least one of said stores is password-secured, in that a password must first be entered by said accessing means in order to access such stores, said pocket-sized data carrying device having manually actuatable memory accessing means, data processing means for shifting data from one memory store to another, and transfer means for executing bidirectional transfer of data between said data carrying device and said external data transfer apparatus, the method comprising the steps of:
entering a predetermined password into the device using said accessing means to enable said device;
manually selecting and accessing a password-secured memory store, using said accessing means;
manually defining with said accessing means the data to be shifted from a secured memory store to one of said unsecured memory stores;
engaging said pocket-sized device with a data transfer apparatus, transferring data from said device to said external data transfer apparatus.

* * * * *